United States Patent
Sileo et al.

(10) Patent No.: US 6,792,763 B2
(45) Date of Patent: *Sep. 21, 2004

(54) COATED SEAL ARTICLE WITH MULTIPLE COATINGS

(75) Inventors: Gerry A. Sileo, Palm Beach Gardens, FL (US); Terry L. Hollis, Wellington, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/295,481

(22) Filed: Nov. 15, 2002

(65) Prior Publication Data

US 2004/0031270 A1 Feb. 19, 2004

Related U.S. Application Data

(63) Continuation-in-part of application No. 10/064,768, filed on Aug. 15, 2002, now Pat. No. 6,675,584.

(51) Int. Cl.[7] ................................................. F02G 7/20
(52) U.S. Cl. .............................. 60/796; 60/799; 60/800; 60/805
(58) Field of Search ........................... 60/796, 799, 800, 60/805

(56) References Cited

U.S. PATENT DOCUMENTS

| | | |
|---|---|---|
| 4,016,718 A | 4/1977 | Lauck |
| 4,465,284 A | 8/1984 | Szema |
| 5,106,104 A | 4/1992 | Atkinson et al. |
| 5,125,796 A | 6/1992 | Cromer |
| 5,265,412 A | 11/1993 | Bagepalli et al. |
| 5,400,586 A | 3/1995 | Bagepalli et al. |
| 5,749,218 A | 5/1998 | Cromer et al. |
| 6,162,014 A | 12/2000 | Bagepalli et al. |
| 6,325,392 B1 | 12/2001 | Halling |
| 6,345,494 B1 | 2/2002 | Coslow |
| 6,412,268 B1 | 7/2002 | Cromer et al. |
| 6,675,584 B1 * | 1/2004 | Hollis et al. .................. 60/796 |

* cited by examiner

Primary Examiner—Justine R. Yu
Assistant Examiner—William H Rodriguez
(74) Attorney, Agent, or Firm—Brian R. Mack (57) ABSTRACT

An improved sealing device for use between a transition duct aft frame and turbine inlet is disclosed. The improved sealing device includes a plurality of corrugated metal seals that are secured to the transition duct aft frame along the arc-like sections of the aft frame. The corrugated seals contact both the transition duct aft frame and turbine inlet to provide a more effective seal and to control the amount of compressor discharge air introduced to cool the turbine vane platforms. In the preferred embodiment, the corrugated seals are coated to reduce wear, fretting, and galling and are used in conjunction with a transition duct thermally free aft frame and pivot bearing mounting system. An alternate embodiment of the seal is also disclosed that utilizes an alternate cooling hole pattern for providing additional cooling air to the turbine vane platform. A further alternate embodiment of the seal incorporates a group of wear reduction coatings from which to select.

14 Claims, 10 Drawing Sheets

COATED SEAL ARTICLE WITH MULTIPLE COATINGS

This application is a continuation-in-part of U.S. patent application Ser. No. 10/064,768, filed Aug. 15, 2002 now U.S. Pat. No. 6,675,584 and assigned to the same assignee hereof.

BACKGROUND OF INVENTION

This invention applies to the combustor section of gas turbine engines used in powerplants to generate electricity. More specifically, this invention relates to the structure that transfers hot combustion gases from a can-annular combustor to the inlet of the turbine.

In a typical can-annular gas turbine engine, a plurality of combustors are arranged in an annular array about the engine. The combustors receive pressurized air from the engine's compressor, add fuel to create a fuel/air mixture, and combust that mixture to produce hot gases. The hot gases exiting the combustors are utilized to turn a turbine, which is coupled to a shaft that drives a generator for generating electricity.

The hot gases are transferred from each combustor to the turbine by a transition duct. Due to the position of the combustors relative to the turbine inlet, the transition duct must change cross-sectional shape from a generally cylindrical shape at the combustor exit to a generally rectangular shape at the turbine inlet. In addition the transition duct undergoes a change in radial position, since the combustors are rigidly mounted radially outboard of the turbine.

In a typical gas turbine engine, transition ducts are surrounded by a plenum of compressed air from the engine's compressor. This air is directed to the combustors and also cools the transition duct walls. Due to the pressure loss associated with the combustion process, the hot gases within the transition duct that enter the turbine are at a lower pressure than the compressed air surrounding the transition ducts. Unless the joints between the transition duct and turbine inlet are properly sealed, excessive amounts of compressed air can leak into the turbine, thereby bypassing the combustor, and resulting in engine performance loss. A variety of seals have been utilized in this region to minimize leakage of compressed air into the turbine. Some examples include stiff "floating" metal seals, brush seals, and cloth seals, depending on the transition duct aft frame configuration. Most common from a manufacturing and cost perspective are "floating" metal seals that are manufactured from a formed plate or sheet metal and are installed such that they can "float" between the aft frame and turbine inlet. Though the "floating" metal seals are quite common, they still have some shortcomings, such as stiffness and tendency to "lock" in place. Seals that are too stiff cannot adequately comply with relative thermal growth between the transition duct and turbine inlet. If the seals "lock" in place they cannot adjust to thermal changes and will leave gaps between the transition duct and turbine inlet. These issues in combination with complex geometry changes, rigid mounting systems, and high operating temperatures as seen by transition ducts create a harsh operating environment that can lead to premature deterioration, requiring repair and replacement of the transition ducts.

To withstand the hot temperatures from combustor gases, transition ducts are typically cooled, usually with air by a variety of methods including internal cooling channels, impingement cooling, or effusion cooling. Severe cracking has occurred with internally air cooled transition ducts having certain geometries that are rigidly mounted to the turbine inlet and contain stiff, rigid seals between the transition duct and turbine inlet. This cracking may be attributable to a variety of factors. Specifically, high steady stresses in the region around the aft end of the transition duct exist where sharp geometry changes occur and a rigid mounting system is utilized. Such a rigid mount located at the transition duct aft end does not allow for adequate movement due to thermal growth of the transition duct. Compounding these problems are stiff "floating" seals that have a tendency to lock into the turbine inlet during installation, further inhibiting movement of the transition duct aft frame region.

The present invention seeks to overcome the shortfalls described in the prior art by specifically addressing the issues with the rigid sealing system by providing an improved sealing system with increased flexibility, cooling, and leakage control. A sealing system must be able to conform to the turbine inlet during installation and provide an effective sealing mechanism despite the varying thermal gradients between the transition duct aft frame and turbine inlet, while not inhibiting movement of the transition duct aft frame. What is needed is a more compliant metal seal that provides improved flexibility during transition duct installation, effective sealing during all operating conditions, and improved durability under high temperature and vibratory conditions. It will become apparent from the following discussion that the present invention overcomes the shortcomings of the prior art and fulfills the need for an improved transition duct to turbine inlet seal.

DETAILED DESCRIPTION OF THE PREFERRED EMBODIMENT

Figure 1:
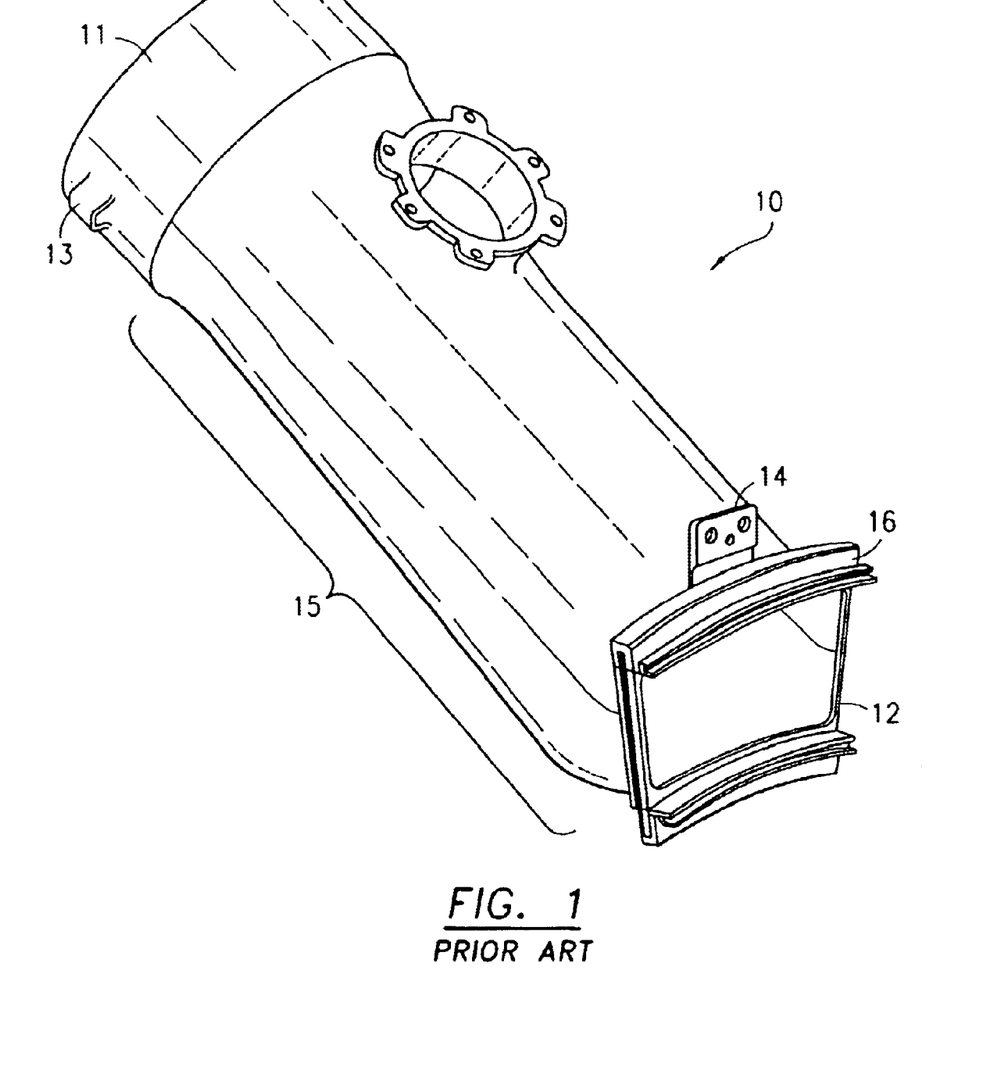
FIG. 1 is a perspective view of a transition duct having a rigid mounting system and rigid sealing system of the prior art.

Referring to FIG. 1, a transition duct 10 incorporating turbine inlet seals of the prior art is shown in perspective view. The transition duct includes a generally cylindrical inlet sleeve 11 and a generally rectangular exit frame 12. The generally rectangular exit shape is defined by a pair of concentric arcs of different diameters connected by a pair of radial lines. The can-annular combustor (not shown)

engages transition duct 10 at inlet sleeve 11. The hot combustion gases pass through transition duct 10 and pass through exit frame 12 and into the turbine (not shown). Transition duct 10 is mounted to the engine by a forward mounting means 13, fixed to the outside surface of inlet sleeve 11 and mounted to the turbine by an aft mounting means 14, which is fixed to exit frame 12. A panel assembly 15, connects inlet sleeve 11 to exit frame 12 and provides the change in geometric shape for transition duct 10. A pair of turbine inlet seals 16 are located along the concentric arcs which help define exit frame 12 and serve to engage a turbine inlet (not shown) in order to minimize compressor air leakage from the region around transition duct 10 into the turbine.

The preferred embodiment of the present invention is shown in an operating environment in FIGS. 2 through 4 and FIG. 9 and in greater detail in FIGS. 5 through 8. The present invention seeks to overcome the shortfalls of the prior art by providing an improved sealing system that provides increased seal flexibility during transition duct installation, effective sealing during all operating conditions, and improved durability under high temperature and vibratory conditions. The improved seal design of the present invention can be utilized with a variety of transition ducts, but will be discussed in accordance with the preferred embodiment.

Figure 2:
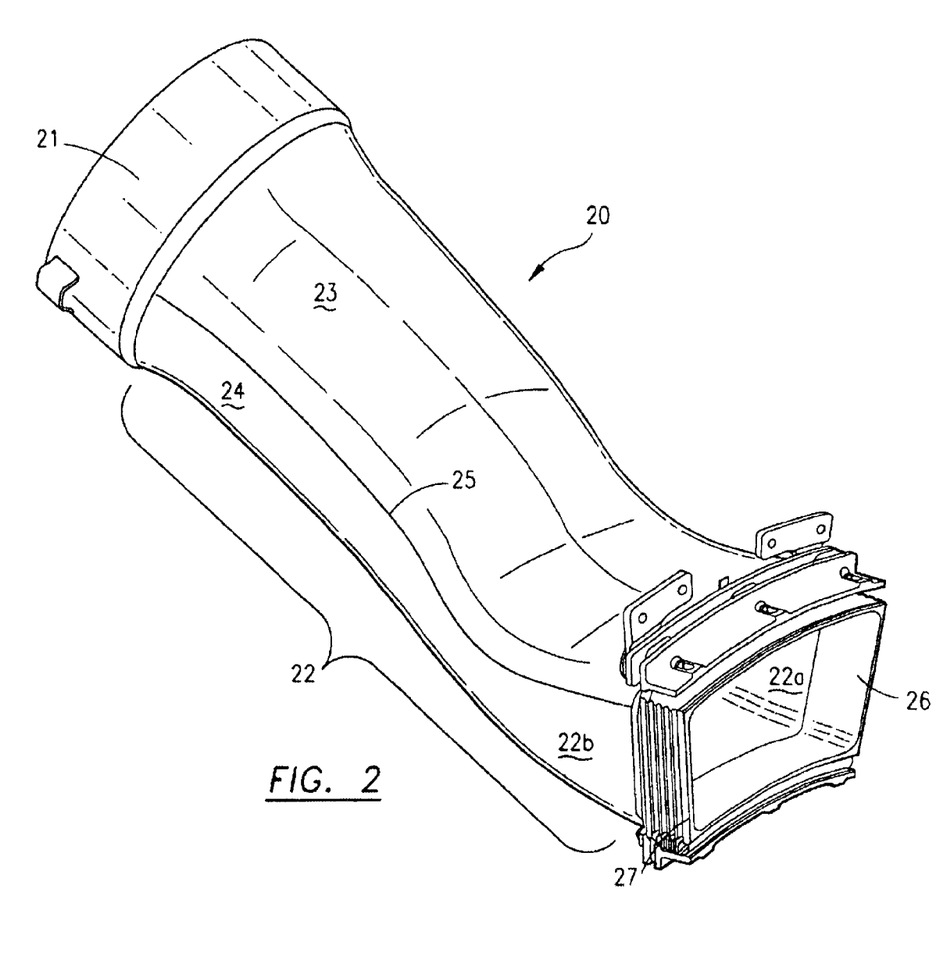
FIG. 2 is a perspective view of a transition duct incorporating the preferred embodiment of the present invention.
Figure 9:
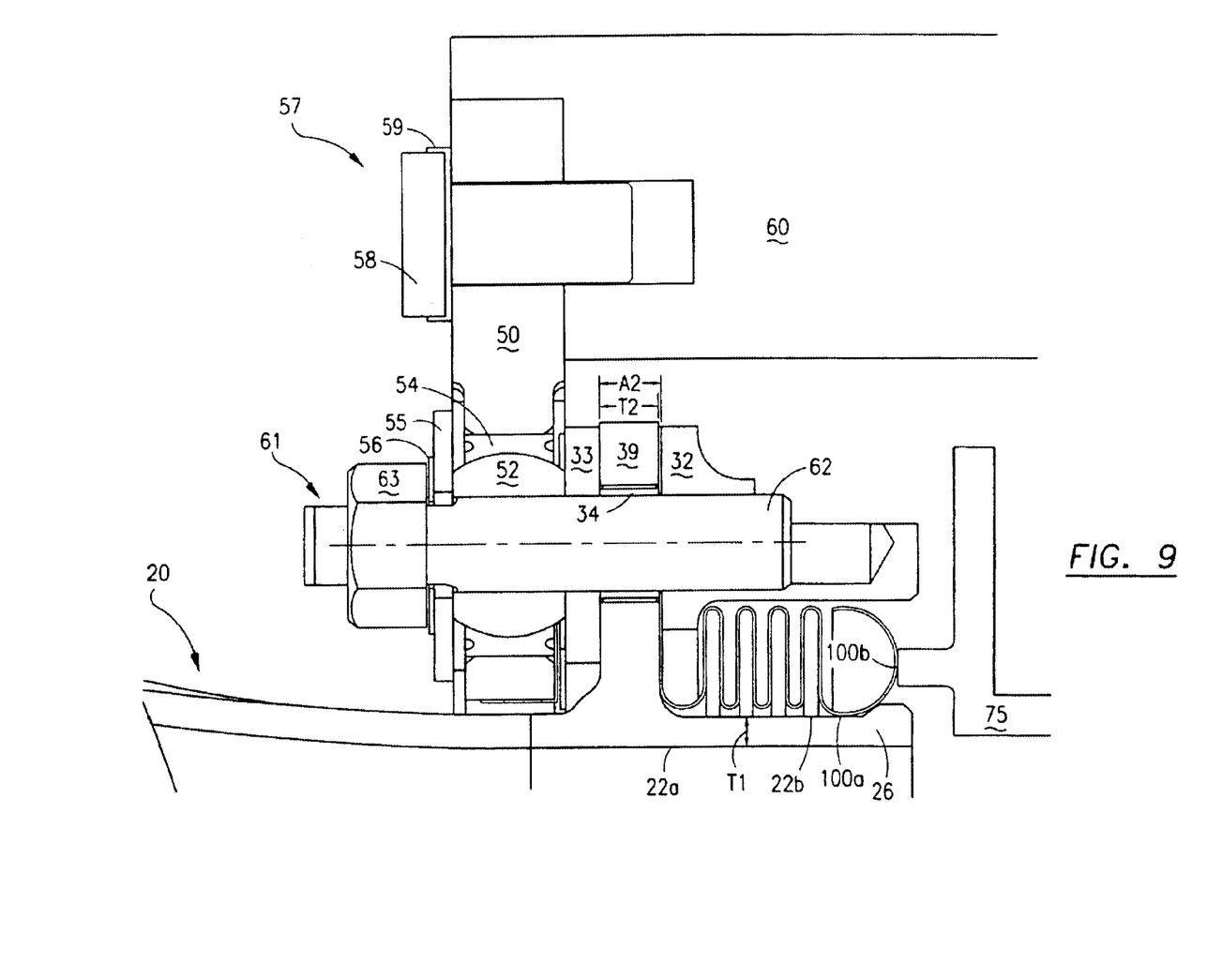
FIG. 9 is a cross section view of a transition duct installed on a turbine inlet incorporating the preferred embodiment of the present invention.

Referring to FIG. 2, the improved sealing system is installed on a transition duct 20 which includes a generally cylindrical inlet sleeve 21 having an inner diameter and an outer diameter. Fixed to inlet sleeve 21 is a panel assembly 22 having a first panel 23 and a second panel 24, with each panel formed from a single sheet of metal. Panel assembly 22 is formed when first panel 23 is fixed to second panel 24 along a plurality of axial seams 25 by a means such as welding. Once assembled, panel assembly 22 forms a duct having an inner wall 22a, an outer wall 22b, and a first thickness T1 there between as shown in FIG. 9. Referring back to FIG. 2, panel assembly 22 further contains a generally cylindrical inlet end and a generally rectangular exit end, with the exit end defined by a pair of arcs of different diameters concentric about a center, with the arcs connected by a pair of radial lines extending from the center. Fixed to the rectangular exit end of panel assembly 22 is a generally rectangular aft frame 26 having opposing sidewalls 27 that are generally perpendicular to the arcs of rectangular exit end of panel assembly 22 as shown in FIGS. 2 and 3.

Figure 3:
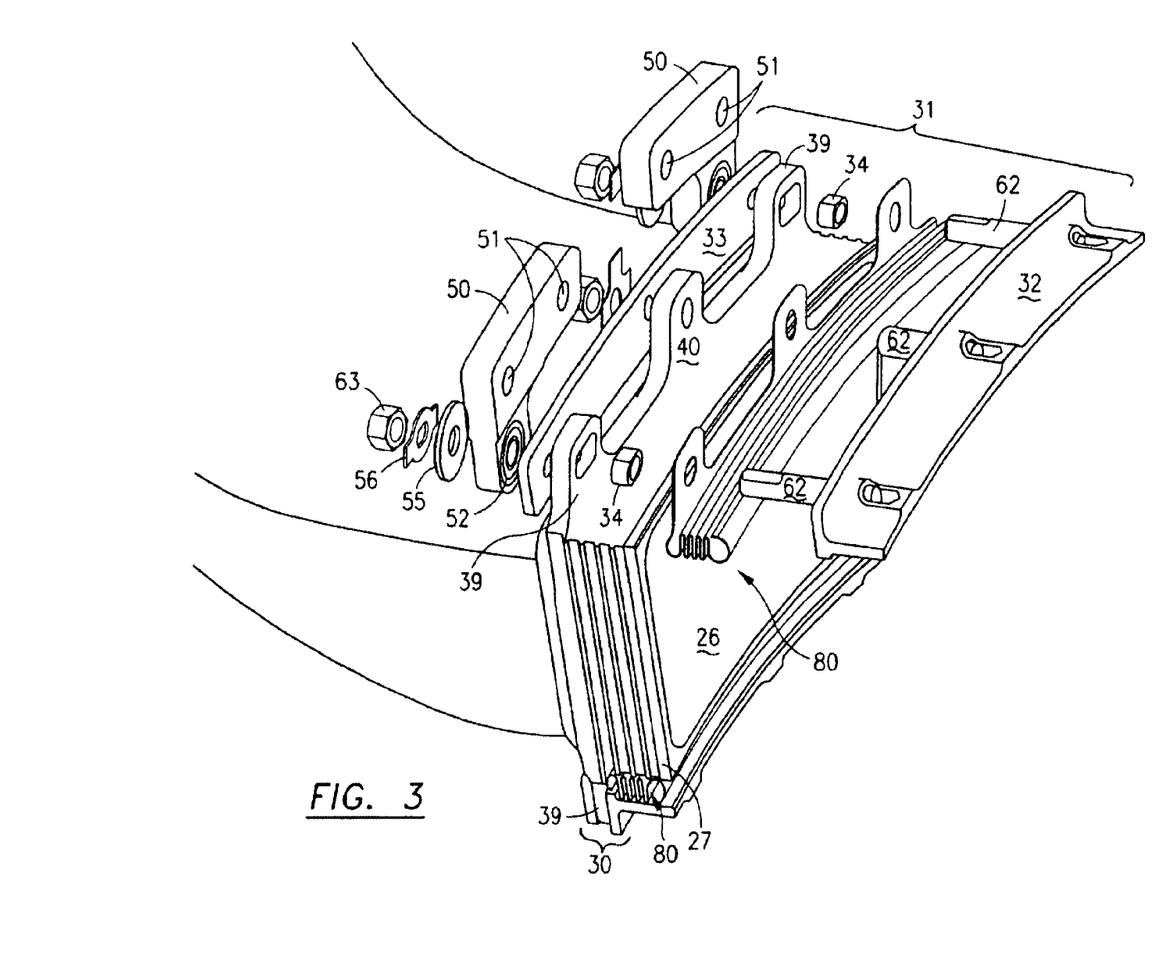
FIG. 3 is an exploded perspective view of the transition duct aft frame incorporating the preferred embodiment of the present invention.

Referring now to FIG. 3, transition duct 20 further includes the features of a thermally free aft frame 26 as described in co-pending U.S. patent application entitled Thermally Free Aft Frame for a Transition Duct and the features of an improved mounting system as described in co-pending U.S. patent application entitled Transition Duct Mounting System, each of which are hereby incorporated by reference. In the preferred embodiment, the present invention is utilized in conjunction with a transition duct having an aft frame that is thermally free and a mounting system that incorporates a plurality of pivot bearings as will now be described in greater detail.

Figure 4:
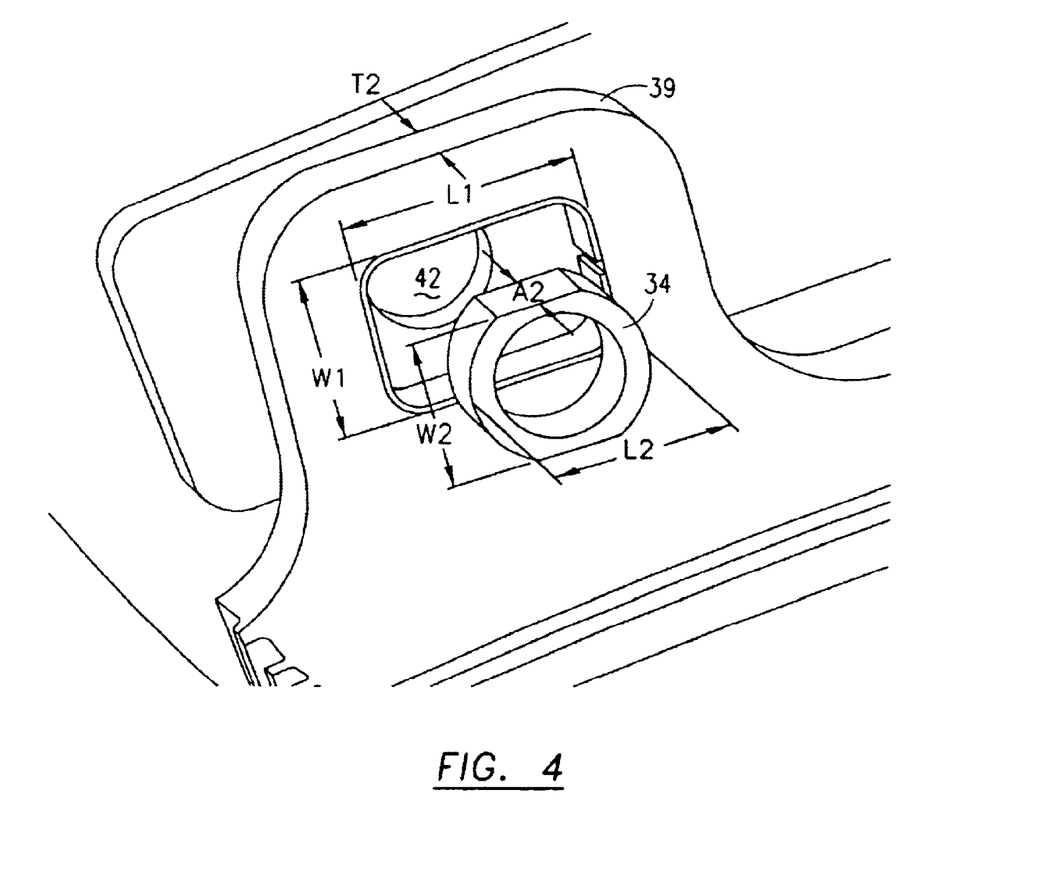
FIG. 4 is a detailed perspective view of a portion of the transition duct aft frame.
Figure 5:
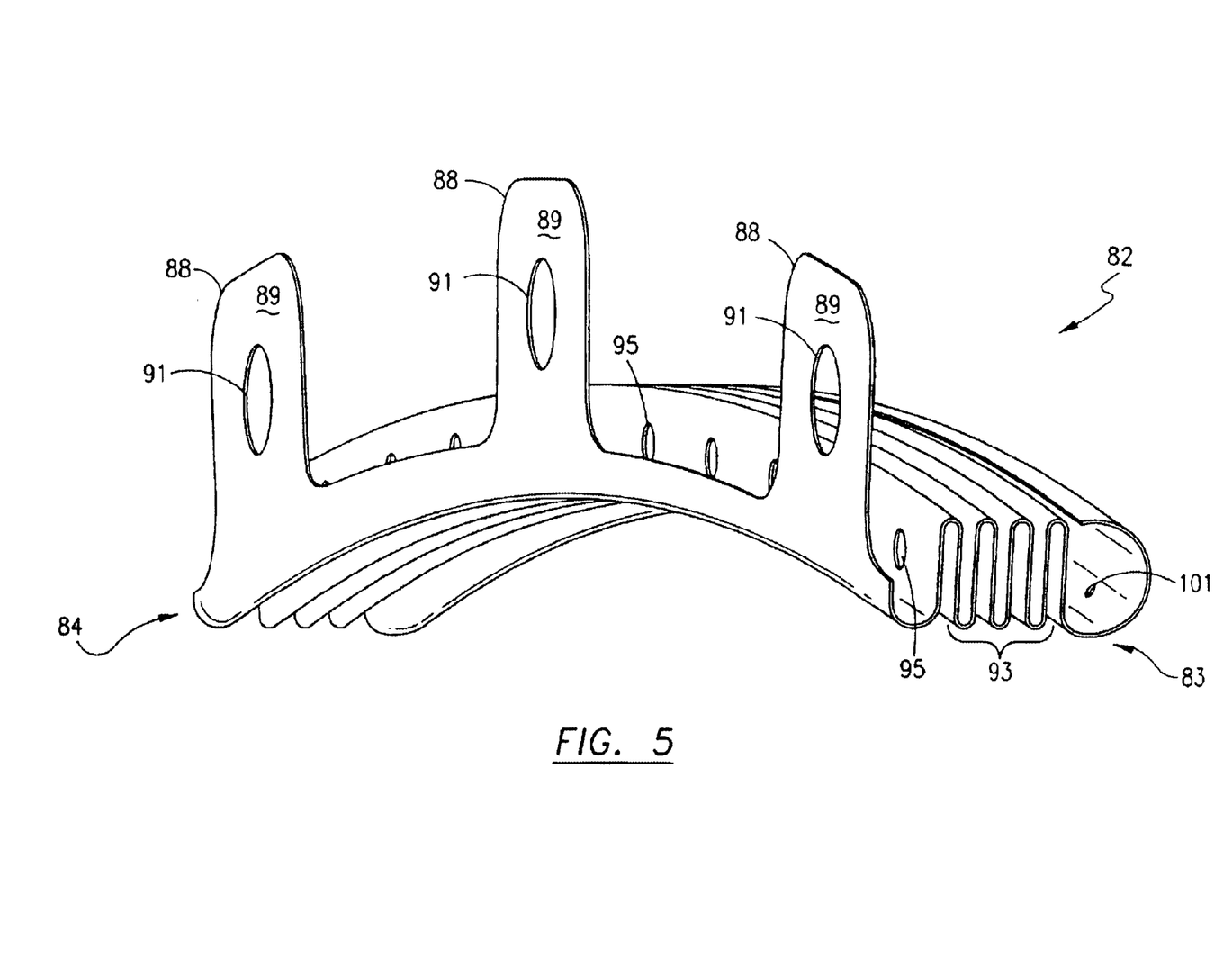
FIG. 5 is a perspective view of the preferred embodiment of the present invention.

Referring to FIGS. 3 and 4, transition duct 20 further includes a plurality of retention lugs 39 and 40 along aft frame 26. As shown in FIG. 4, each of retention lugs 39 and 40 have a second thickness T2 and contain a slot having a first circumferential length L1 and a first radial width W1. Outermost retention lugs 39 are located proximate the ends of the arcs that define the generally rectangular end and each outermost retention lug has a slot that includes a first circumferential length L1 greater than its first radial width W1.

Fixed to aft frame 26 through retention lugs 39 and 40 are inner and outer bulkhead assemblies 30 and 31. Inner bulkhead assembly 30 and outer bulkhead assembly 31 capture retention lugs 39 and 40 in a manner that allows aft frame 26 to expand under thermal gradients. Inner and outer bulkhead assemblies 30 and 31 are identical in structural components and function and only differ in physical location. For clarity purposes, outer bulkhead assembly 31 will be described in further detail. For example, each bulkhead assembly includes a first and second bulkhead, each having a plurality of first and second holes, respectively. Referring to FIG. 3, outer bulkhead assembly 31 includes a first outer bulkhead 32 having first holes and a second outer bulkhead 33 having second holes. Furthermore, each bulkhead assembly includes a plurality of bushings 34, and as shown in FIG. 4, each bushing having a second axial length A2, a second circumferential length L2, a second radial width W2, and a third through hole. Bushings 34 are located within each slot of outer retention lugs 39 of aft frame 26 and are preferably pressfit into the slot. Bushings 34 are sized such that first circumferential length L1 of the slot in each of outer retention lugs 39 is greater than second circumferential length L2 of bushing 34, thereby allowing for relative circumferential movement of each of the outermost retention lugs 39, and hence aft frame 26, relative to the bushings received therein. To accommodate relative axial movement due to thermal growth, bushings 34 have a second axial length A2 greater than the second thickness T2 of outer retention lugs 39 as shown in FIG. 9. Due to vibration and movement amongst mating parts, bushings 34 are preferably manufactured from a hardened material such as Haynes 25.

Another component of transition duct 20 in which the present seal invention is utilized incorporates the mounting assembly for fixturing transition duct 20 to a turbine inlet. Referring back to FIG. 3, the transition duct mounting assembly includes a plurality of mounting plates 50, each having at least a fourth through hole 51 and a spherical bearing 52 with a fifth through hole 53. Bearing 52 is located within a housing 54, as shown in FIG. 9, and controls the amount of movement of bearing 52. Mounting plates 50 have a general "L" shape with a plurality of fourth through holes 51. In order to reduce the amount of wear to spherical bearing 52 it is fabricated from a cobalt based alloy such as Stellite 6B while housing 54, though also fabricated from a cobalt-based alloy, is preferably Haynes 25. Furthermore, the aft mount assembly includes a plurality of washers 55, a plurality of lock tabs 56, and a first means for securing 57 mounting plates 50 to a turbine inlet 60. First securing means 57 preferably includes a bolt 58 and lock tab 59 for securing transition duct to turbine inlet 60.

Figure 6:
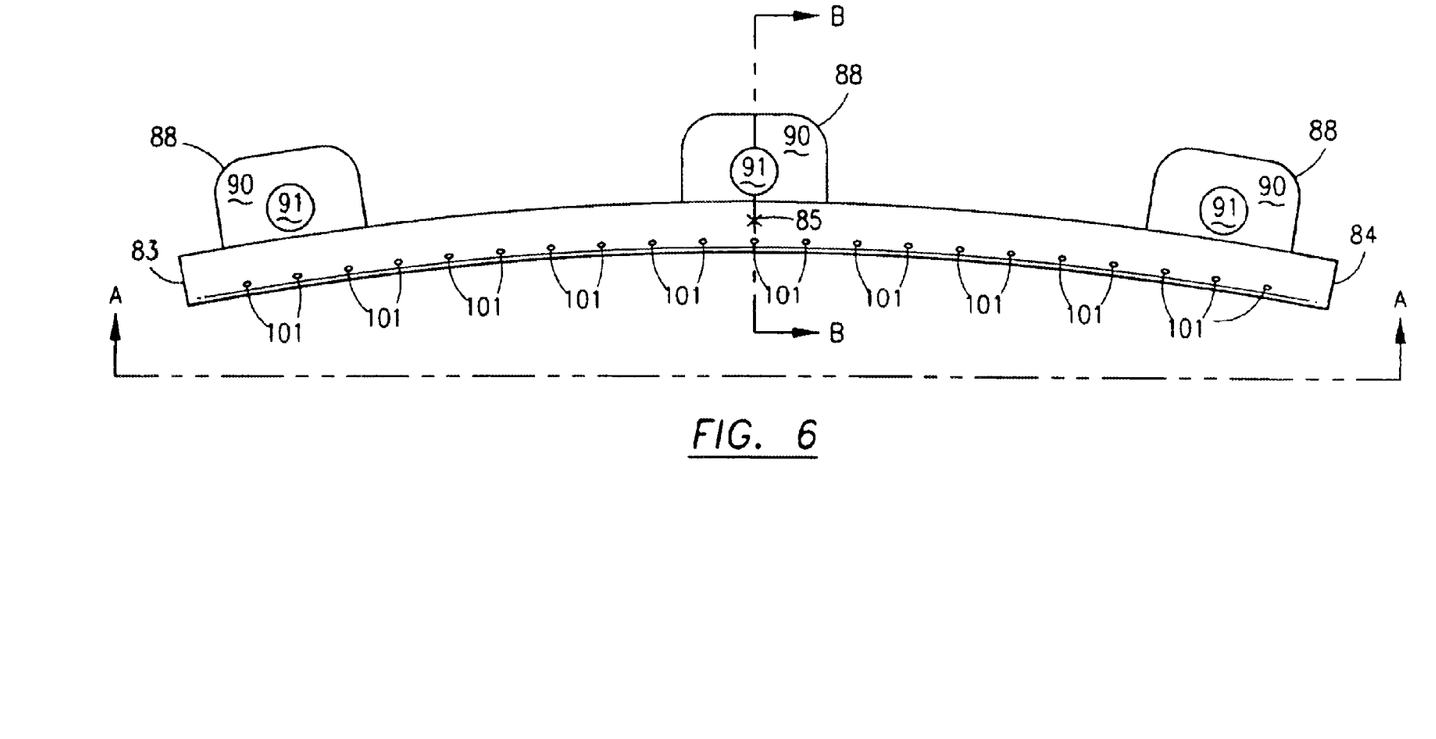
FIG. 6 is an end view of the preferred embodiment of the present invention.
Figure 7:
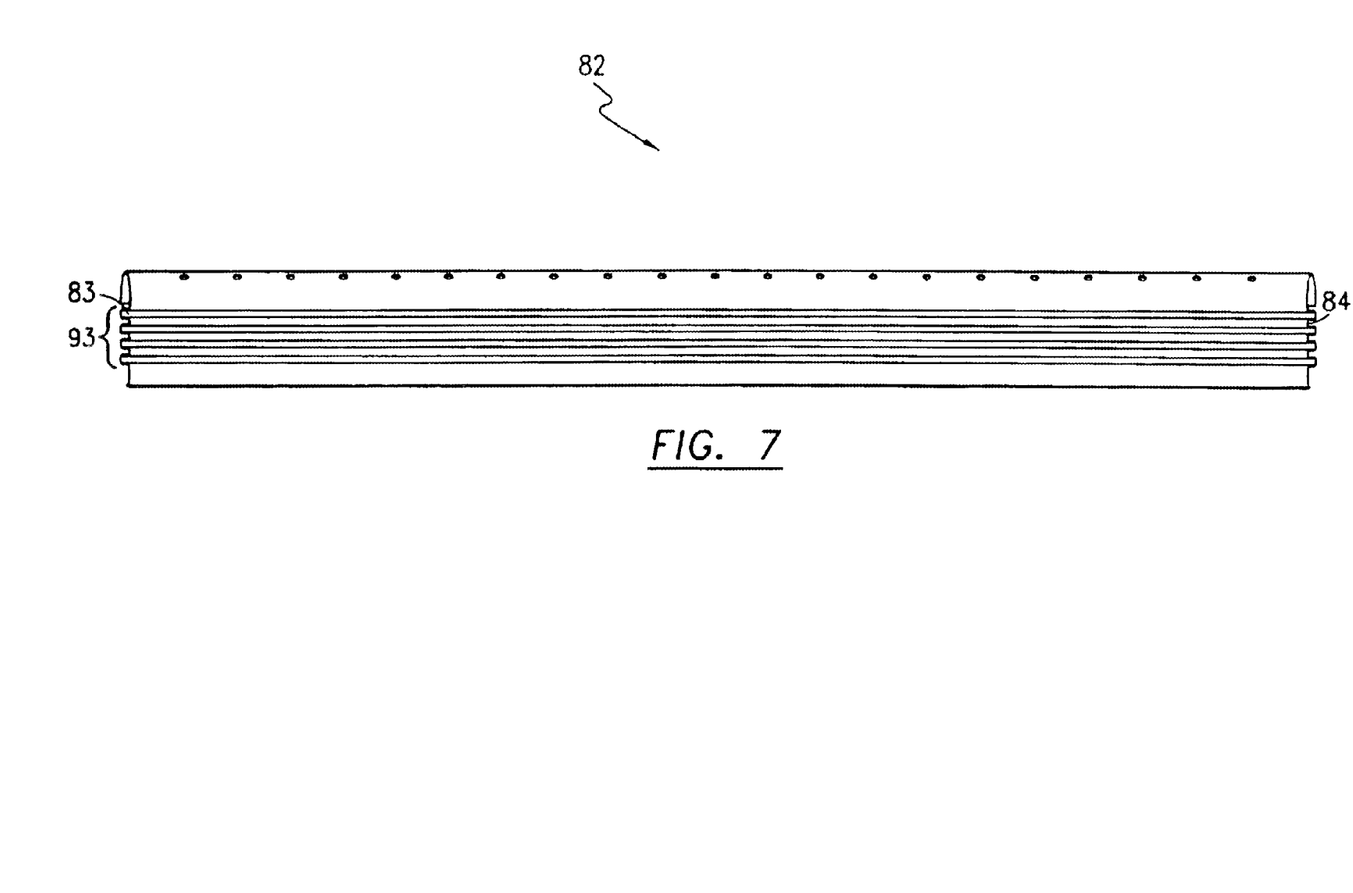
FIG. 7 is a bottom view of the preferred embodiment of the present invention.
Figure 8:
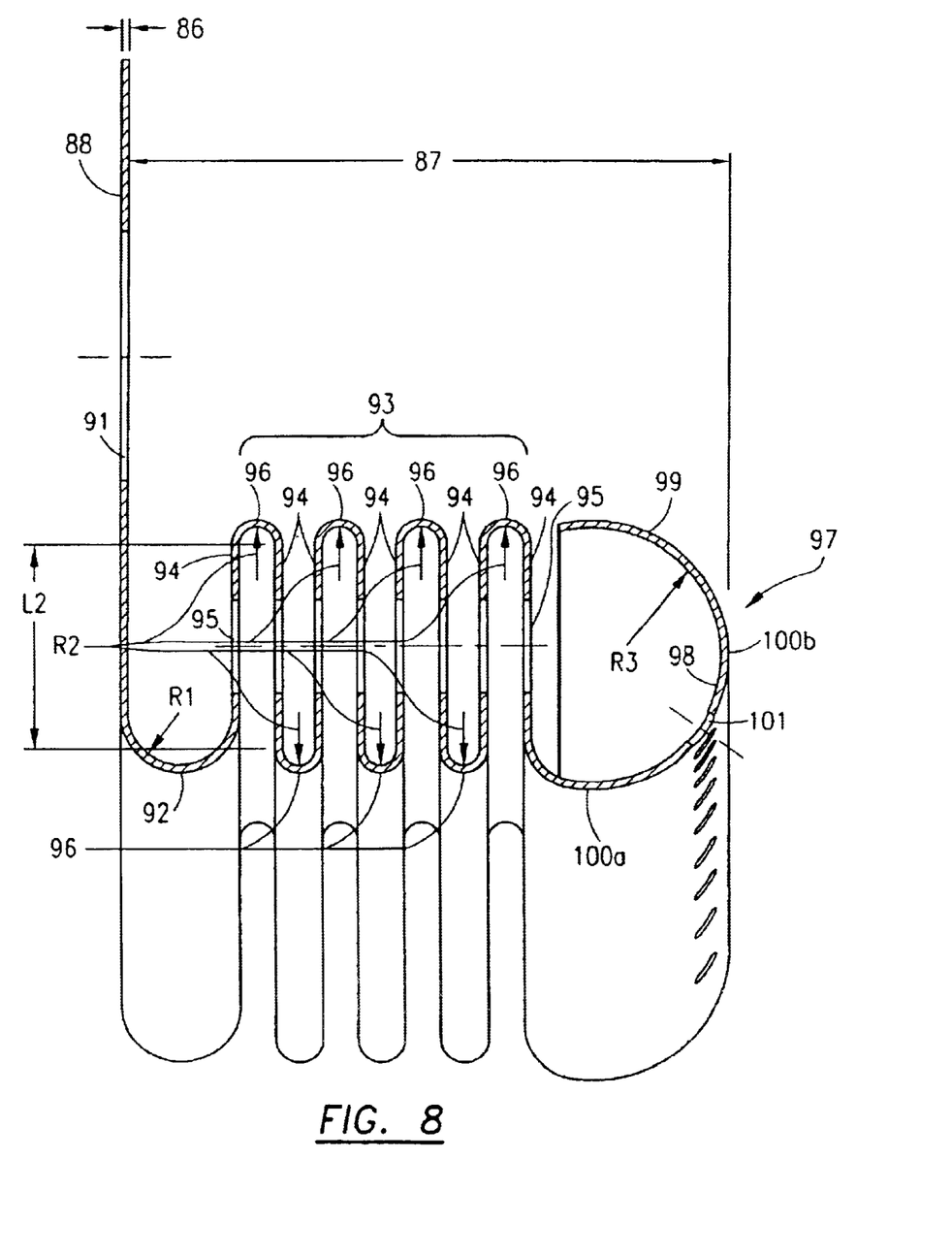
FIG. 8 is a cross section view of the preferred embodiment of the present invention.

The preferred embodiment of the present invention is shown in detail in FIGS. 5 through 8 and installed in the preferred transition duct assembly in FIGS. 3 and 9. The present invention, corrugated seals 80 which are located between transition duct aft frame 26 and turbine inlet 60, are shown in detail in FIG. 5. FIG. 6 is a view taken from the aft end of the seal while FIG. 7 is a bottom view of the seal taken as view A—A from FIG. 6. Meanwhile, FIG. 8 is a cross section view taken through section B—B of FIG. 6.

Transition ducts use an inner and outer corrugated sealing devices 81 and 82, respectively, to seal the joint between transition duct aft frame 26 and turbine inlet 60. Each corrugated seal has a general arc-shape that is concentric about the center that defined the arcs of generally rectangular exit end of aft frame 26. As with bulkhead assemblies 30 and 31, corrugated seals 80 are identical in function and therefore, for clarity purposes, only outer corrugated seal 82 will be described in detail. Outer corrugated seal 82 has a first end 83, a second end 84, and a centerpoint 85 (see FIG. 6) positioned along arc-shaped corrugated seal 82 equidistant between first end 83 and second end 84. Outer corrugated seal 82 is fabricated from flat sheet metal, ideally from a single sheet construction, but assembly of seal components may be necessary to facilitate manufacturing. Referring back to FIG. 5, corrugated seal 82 also contains a plurality of mounting tabs 88, each of mounting tabs 88 having a first surface 89, a second surface 90, thereby defining a seal thickness 86 there between, and a plurality of mounting holes 91 located within mounting tabs 88, each having a diameter of at least 0.500 inches, for mounting corrugated seal 82 to aft frame 26 at retention lugs 39 and 40. Seal 82 has a seal thickness 86 and a seal length 87, both of which are best shown in FIG. 8. In the preferred embodiment, corrugated seal 80 is fabricated from Inconnel 718 and has a seal thickness 86 of at least 0.015 inches. Referring to FIG. 8, adjacent to mounting tabs 88 is a first fold 92 having a first radius R1 of at least 0.150 inches. Extending from first radius 92 is a plurality of flexible corrugations 93, each corrugation having two generally parallel walls 94 having a length L2 of at least 0.500 inches. Furthermore, each wall 94 has at least a feed hole 95 with a diameter of at least 0.250 inches for supplying cooling air to corrugated seal 82. Walls 94 are interconnected by a second fold 96 having a second radius R2 of at least 0.062 inches. Extending from flexible corrugations 93, opposite of first fold 92, is a sealing member 97 having a third radius R3 of at least 0.350 inches, a third surface 98, and a fourth surface 99. Located along fourth surface 99 is a plurality of sealing points 100a and 100b where sealing point 100a contacts aft frame 26 of transition duct 20 and sealing point 100b contacts a turbine vane platform 75 of turbine inlet 60, as shown in FIG. 9. Each of sealing points 100a and 100b aid to control the amount of compressor air that enters the turbine from around aft frame 26 of transition duct 20. Also located in sealing member 97 is a plurality of cooling holes 101, where in the preferred embodiment, cooling holes have an equal diameter of at least 0.100 inches, such that cooling holes 101 are in fluid communication with feed holes 95 for providing cooling air to corrugated seal 82 and to turbine vane platform region 75 within the turbine section. Cooling of turbine vane platform 75 is necessary due to the hot combustion gases exiting from transition duct 20. Providing a flexible corrugated seal 82 that ensures engagement with transition duct aft frame 26 and turbine vane platform 75 of turbine inlet 60 along with known cooling hole sizes and quantities will provide a constant amount of compressed air to cool turbine vane platform 75, a location known to have regions of thermal stress from inadequate cooling.

In order to ensure sufficient integrity in corrugated seal 82 when installed in the engine and mated against transition duct aft frame 26 and turbine vane platform 75 of turbine inlet 60, seal 82, in the preferred embodiment, is coated at various locations where it comes in contact with adjacent hardware. A titanium aluminum nitride (TiAlN) coating 1–5 microns thick is applied along second folds 96 of flexible corrugations 93 and fourth surface 99 of sealing member 97. Typically this coating is applied by cathodic arc deposition. Titanium aluminum nitride is an extremely hard coating and can therefore be applied relatively thin and is utilized to reduce fretting, galling, and wear of seal 82 when installed against the mating hardware. Though the seal is designed to be the replaceable component and will eventually wear, the coating application helps to extend the component life. First surface 89 of mounting tabs 88 have an aluminum bronze coating applied approximately 0.003 to 0.006 inches thick to help reduce fretting and galling, and since an aluminum bronze coating is softer than the TiAlN coating applied elsewhere on the seal, the aluminum bronze coating will have less of a detrimental effect on its respective mating surfaces along aft frame 26, since these mating surfaces are typically uncoated. Aluminum bronze coating is unique in that it has the ability to be applied to only one surface, the first surface 89 of mounting tabs 88, yet protect both first surface 89 and its coupled surface of aft frame 26.

Figure 10:
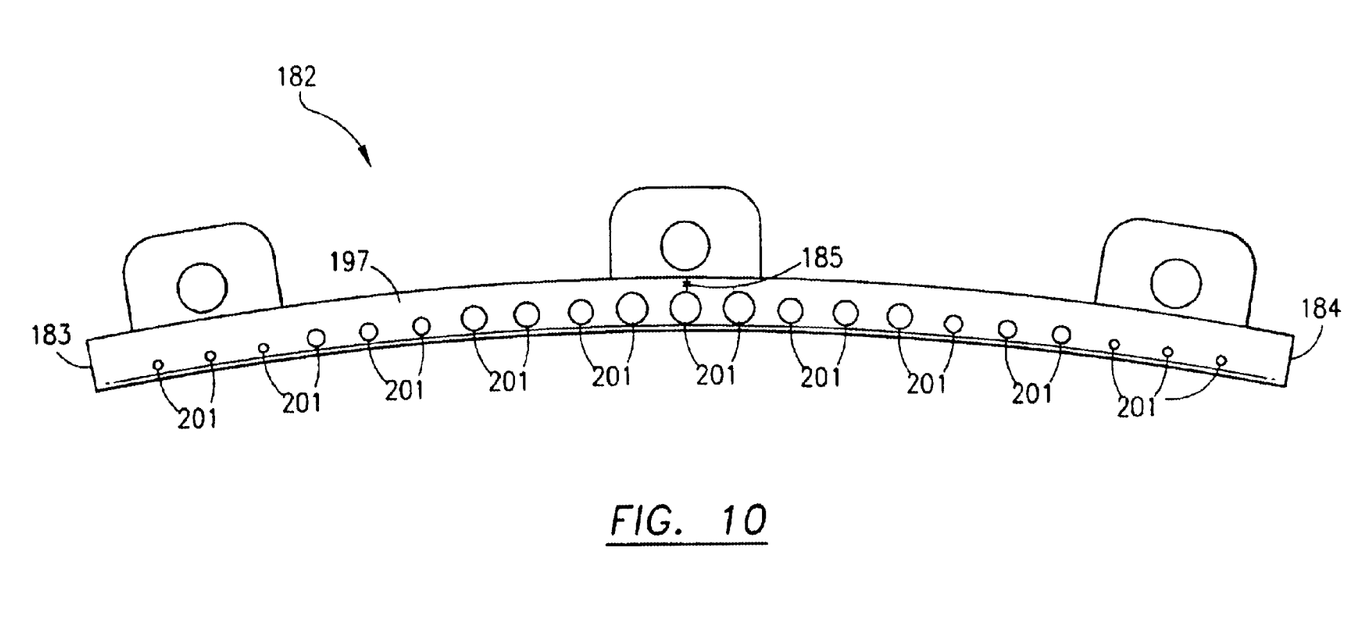
FIG. 10 is an end view of an alternate embodiment of the present invention.

An alternate embodiment of the corrugated sealing device of the present invention is shown in FIG. 10. Alternate corrugated seal 182, with the exception of cooling holes 201, is identical to the preferred embodiment. In alternate corrugated seal 182, cooling holes 201 in sealing member 197 are varying in diameter such that the smallest cooling hole diameter is proximate first end 183 and second end 184. In comparison, the largest cooling hole diameter is proximate centerpoint 185 of alternate corrugated seal 182, such that a greater supply of cooling air is provided to the centerpoint region of seal 182 than first end 183 or second end 184. This in turn will supply a greater amount of air to cool the centermost region of the turbine vane platform (not shown), which will lower vane operating temperatures at locations having historically high temperatures.

In a second alternate embodiment of the corrugated sealing device, the sealing device is identical in structure to that of the preferred embodiment or the first alternate embodiment with the exception being the types of coating applied to the surfaces that mate with adjacent hardware. An Aluminum-Bronze based coating composition, commonly known in the coating industry to be consisting essentially of copper with lesser amounts of aluminum and iron, is the preferred choice for a first coating along first surface 89 of mounting tabs 88, in order to protect both first surface 89 and its coupled surface of aft frame 26 by providing a lubricous anti-fret coating. A plurality of coatings can be chosen from to serve as a wear coating, or second coating, along second folds 96 of flexible corrugations 93 and fourth surface 99 of sealing member 97. The second coating for second folds 96 and fourth surface 99 is selected from a group comprising Titanium Aluminum Nitride, Aluminum Titanium Nitride, Titanium Nitride, Stellite 31, and Stellite 694, or a combination of either Titanium Aluminum Nitride, Aluminum Titanium Nitride, or Titanium Nitride, with Aluminum Bronze. Stellite 31 is a trademark of Stoody Deloro Stellite Inc. for a CoCrNiW alloy and Stellite 694 is a trademark composition of Stoody Deloro Stellite Inc. for a CoCrWNi alloy. The Titanium Nitride based coatings provide resistance from high temperature wear and oxidation with Titanium Nitride providing the least amount of oxidation resistance and ideal for lower temperature conditions, while Aluminum Titanium Nitride provides the greatest amount of oxidation resistance and is more suitable for high temperature conditions. Titanium Aluminum Nitride, having a much smaller percentage composition of aluminum than Aluminum Titanium Nitride results in a lower oxidation resistance than Aluminum Titanium Nitride, yet higher oxidation resistance than Titanium Nitride. Titanium Aluminum Nitride, Aluminum Titanium Nitride, or Titanium Nitride can be used independently or in combination with Aluminum Bronze. Independently they provide wear resistance due to the hardface barrier coating and oxidation resistance, depending on the operating temperatures. When used in combination with an Aluminum Bronze coating, not only is a hardface created for wear resistance but the coated surface also has a greater resistance to fretting due to the lubricious surface that is created therefore further mitigating wear of flexible corrugations 93 and fourth surface 99 of corrugated seal 82. Alternately, Stellite 31 and Stellite 694, each cobalt based alloys, provide a single coating system that has a high temperature wear resistance, anti-fretting, and a lubricious surface, that accomplishes the same goals achieved by the combination coatings previously identified due to their constituent phases and oxide formers. As with the preferred embodiment, these wear coatings are incorporated as a means to further extend component life, resulting in fewer replacement components, and reduced operating costs associated with the transition duct.

Referring to FIGS. 3 and 9, transition duct 20 is secured to the aft mount assembly at its aft frame 26 by a second securing means 61, which preferably includes a stud 62 and nut 63. For example, stud 62 passes through a first hole in first outer bulkhead 32, through a mounting hole 91 in mounting tabs 88 of outer corrugated seal 82, through a slot in outermost retention lug 39 and bushing 34 pressfit therein, through a second hole in second outer bulkhead 33, through fifth hole 53 of bearing 52, through washer 55, through lock tab 56 and is secured to nut 63. Through the use of first securing means 57 and second securing means 61, transition duct 20 is engaged to the turbine inlet 60 via the aft mount assembly. The corrugated seals 81 and 82 provide improved flexibility both during transition duct installation and engine operation such that they respond more effectively to thermal gradients between transition duct aft frame 26 and turbine vane platform 75 of turbine inlet 60. When corrugated seals 80 are utilized in conjunction with a thermally free aft frame 26, which allows for circumferential and axial movement of the transition duct aft frame, and an improved mounting system, which utilizes pivot bushings for greater movement, the resulting transition duct assembly has significantly lower operating stresses, improved installation, and improved performance yielding an extended component life.

While the invention has been described in what is known as presently the preferred embodiment, it is to be understood that the invention is not to be limited to the disclosed embodiment but, on the contrary, is intended to cover various modifications and equivalent arrangements within the scope of the following claims.

We claim:

1. A sealing device having a general arc-shape for use between a gas turbine combustor transition duct aft frame and a turbine inlet, said sealing device comprising:
   a first end;
   a second end;
   a centerpoint positioned along said arc-shaped sealing device equidistant between said first and second ends;
   a plurality of mounting tabs, each of said mounting tabs having a first surface, a second surface, thereby defining a seal thickness there between, and a plurality of mounting holes;
   a first fold having a first radius R1 and connected to said mounting tabs;
   a plurality of flexible corrugations fixed to said first fold, each of said corrugations having two generally parallel walls of length L2, each of said walls having at least a feed hole and said walls are interconnected by a second fold, said second fold having a second radius R2;
   a sealing member fixed to one of said corrugations opposite said first fold and having a third radius R3, a third surface, a fourth surface, a plurality of sealing points located along said fourth surface, and a plurality of cooling holes;
   a seal length;
   a first coating applied to said first surface of said mounting tabs, said first coating consisting essentially of a primarily Aluminum-Bronze based composition; and
   a second coating applied to said second folds and said fourth surface of said sealing member as a wear material, said second coating is selected from a group comprising Titanium Aluminum Nitride, Aluminum Titanium Nitride, Titanium Nitride, Stellite 31, and Stellite 694.

2. The sealing device of claim 1 wherein said first coating is applied by cathodic arc deposition.

3. The sealing device of claim 1 wherein said sealing device is fabricated from Inconnel 718.

4. The sealing device of claim 1 wherein said seal thickness is at least 0.015 inches.

5. The sealing device of claim 1 wherein each mounting hole in said mounting tabs has a diameter of at least 0.500 inches.

6. The sealing device of claim 1 wherein said first radius R1 of said first fold is at least 0.150 inches.

7. The sealing device of claim 1 wherein said corrugations have a length L2 of at least 0.500 inches and a second radius R2 of said second fold of at least 0.062 inches.

8. The sealing device of claim 1 wherein said at least one feed hole has a diameter of at least 0.250 inches.

9. The sealing device of claim 1 wherein said third radius R3 of said sealing member is at least 0.350 inches.

10. The sealing device of claim 1 wherein said plurality of cooling holes of said sealing member have an equal diameter of at least 0.100 inches.

11. The sealing device of claim 1 wherein said cooling holes of said sealing member have a varying diameter wherein the smallest cooling hole diameter is proximate said first and second ends and the largest cooling hole diameter is proximate said centerpoint of said arc-shaped seal.

12. The sealing device of claim 1 wherein said first coating application is applied to said first surface at least 0.003 inches thick.

13. The sealing device of claim 1 wherein said second coating application is applied to said second folds and said fourth surface at a thickness greater than 0.000 inches but less than 0.002 inches.

14. The sealing device of claim 1 wherein said second folds and said fourth surface further include an Aluminum Bronze based overcoating applied at least 0.0003 inches thick over a second coating consisting of either Titanium Aluminum Nitride, Aluminum Titanium Nitride, or Titanium Nitride.

* * * * *